United States Patent
Nishiyama

(10) Patent No.: US 7,271,925 B2
(45) Date of Patent: Sep. 18, 2007

(54) RECORDING MEDIUM FOR RECORDING PRINTING PROGRAMS AND PRINTING SYSTEM FOR CONFIDENTIAL PRINTING

(75) Inventor: Junichi Nishiyama, Atsugi (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 987 days.

(21) Appl. No.: 09/949,615

(22) Filed: Sep. 12, 2001

(65) Prior Publication Data

US 2002/0036790 A1 Mar. 28, 2002

(30) Foreign Application Priority Data

Sep. 14, 2000 (JP) ............................. 2000-279796

(51) Int. Cl.
*G06K 15/00* (2006.01)
*G06F 3/12* (2006.01)

(52) U.S. Cl. .................................... 358/1.14; 358/1.15

(58) Field of Classification Search ............... 358/1.14, 358/1.15, 1.13, 1.1, 468, 407, 437, 1.18, 358/1.11, 1.12, 1.16, 1.17; 380/201, 243; 713/176

See application file for complete search history.

(56) References Cited

U.S. PATENT DOCUMENTS

| | | | | |
|---|---|---|---|---|
| 5,258,998 A | * | 11/1993 | Koide | .................. 375/220 |
| 5,633,932 A | * | 5/1997 | Davis et al. | ................. 713/176 |
| 6,894,792 B1 | * | 5/2005 | Abe | .......................... 358/1.15 |
| 6,943,907 B1 | * | 9/2005 | Kim | .......................... 358/1.14 |
| 7,003,667 B1 | * | 2/2006 | Slick et al. | ................. 713/182 |
| 2002/0054109 A1 | * | 5/2002 | Ogino et al. | ................. 345/764 |
| 2002/0064280 A1 | * | 5/2002 | Gassho | ....................... 380/201 |

FOREIGN PATENT DOCUMENTS

| | | |
|---|---|---|
| JP | 06-237389 | 8/1994 |
| JP | 08-314659 | 11/1996 |

* cited by examiner

*Primary Examiner*—Dov Popovici
(74) *Attorney, Agent, or Firm*—Buchanan Ingersoll & Rooney PC

(57) ABSTRACT

A method of processing a printing job data is provided in which the secrecy of a job data required for the confidential printing can be ensured in the display of a status data indicative of a printing state of the job data. The method includes examining whether the confidential printing for a job data to be printed out is requested or not; when the confidential printing is requested, deleting or altering the document name contained in the job data; and releasing the job data from which the document name has been deleted or altered.

14 Claims, 22 Drawing Sheets

| No. | DOCUMENT NAME | OWNER NAME | TIME | STATUS |
|---|---|---|---|---|
| 1 | TEXT1 | SUZUKI | 10:00 | PRINTING |
| 2 |  | SATOH | 10:01 | WAITING |
| 3 | TEXT3 | TANAKA | 10:02 | WAITING |
| 4 | TEXT4 | SATOH | 10:03 | WAITING |

Fig.5

| | ... | | |
|---|---|---|---|
| HEADER | OWNER NAME | DOCUMENT NAME | ORIGINAL SIZE |
| | ... | | |
| MAIN DATA | (IMAGE DATA) | | |

*Fig.14*

| | JOB MANAGEMENT UTILITY ⦿ NORMAL MODE ○ OWNER & MANAGER MODE USER NAME:_____ PASSWORD:_____ | | | |
|---|---|---|---|---|
| No. | DOCUMENT NAME | OWNER NAME | TIME | STATUS |
| 1 | TEXT1 | SUZUKI | 10:00 | PRINTING |

Fig.15

| No. | DOCUMENT NAME | OWNER NAME | TIME | STATUS |
|---|---|---|---|---|
| | JOB MANAGEMENT UTILITY ○ NORMAL MODE ● OWNER & MANAGER MODE USER NAME:SUZUKI PASSWORD:******** | | | |
| 1 | TEXT1 | SUZUKI | 10:00 | PRINTING |
| 2 | TEXT2 | SUZUKI | 10:01 | (LOCK) WAITING |

Fig.16

| No. | DOCUMENT NAME | OWNER NAME | TIME | STATUS |
|---|---|---|---|---|
| | | JOB MANAGEMENT UTILITY ○ NORMAL MODE ◉ OWNER & MANAGER MODE USER NAME:TANAKA PASSWORD:******** | | |
| 1 | TEXT1 | SUZUKI | 10:00 | PRINTING |

Fig.17

| No. | DOCUMENT NAME | OWNER NAME | TIME | STATUS |
|---|---|---|---|---|
| | | JOB MANAGEMENT UTILITY ◯ NORMAL MODE ● OWNER & MANAGER MODE USER NAME:ADMIN PASSWORD:******** | | |
| 1 | TEXT1 | SUZUKI | 10:00 | PRINTING |
| 2 | | SUZUKI | 10:01 | (LOCK) WAITING |
| 3 | | SATOH | 10:02 | (LOCK) WAITING |

Fig.23

| No. | DOCUMENT NAME | OWNER NAME | TIME | STATUS |
|---|---|---|---|---|
| 1 | TEXT1 | SUZUKI | 10:00 | PRINTING |
| 2 | TEXT2 | SUZUKI | 10:01 | (LOCK) WAITING |

JOB MANAGEMENT UTILITY

RECORDING MEDIUM FOR RECORDING PRINTING PROGRAMS AND PRINTING SYSTEM FOR CONFIDENTIAL PRINTING

This application is based on application No. 2000-279796 filed in Japan, the contents of which is hereby incorporated by reference.

BACKGROUND OF THE INVENTION

The present invention relates to a printing system for printing job data and a method implemented with the printing system.

In a printing system comprising a printer and a data processor (referred to as a PC hereinafter) for providing the printer with job data such as image data or text data, a printer driver is commonly installed on the PC for allowing the PC to control the printer in order to identify the printer to which the job data is delivered. The printing conditions including the time of print output and the number of prints can be arbitrarily determined by the user on the printer driver, and the information for the printing conditions is transmitted together with the job data to the printer for controlling the printing action. There is a known technique in which the information for the printer including the current action mode (for example, paper feeding, printing, or paper discharging), the printing state of the job data, the error (for example, feeding error), and the information for optional equipments (e.g. a duplex printing unit and a finisher) including the existence of the optional equipment connected to the printer, the errors can be obtained by the printer driver during communicating with the printer, and the informations can be displayed as status information for the printer and the optional equipments. In such a technique, the document name, the owner name, and the printing registration time at the printer for the job data may also be displayed together with the printing state of the job data (printing or waiting).

The printing system has a secret printing function where a job data which is confidential is tagged with a password by the user operating the printer driver and can thus be printed out only when the password is entered on the printer. In the prior art, the status data such as the document name and the owner name of the job, the printing registration time of the printer are displayed on the printer driver in case of the confidential printing as well as case of common printing. This may deteriorate the secrecy of the job data by guessing its content from the document name.

The present invention has been developed in view of the above technical drawback and its object is to maintain the secrecy of a job data required for the confidential printing in the display of a status data indicative of a printing state of the job data.

SUMMARY OF THE INVENTION

In an aspect of the present invention, there is provided a recording medium in which a program for a printer driver is stored and can be read out by a computer, the program comprising the steps of: examining whether the confidential printing for a job data to be printed out is requested or not; when the confidential printing is requested, deleting or altering the document name contained in the job data; and releasing the job data from which the document name has been deleted or altered.

The program may further comprises a step of requesting the confidential printing for the job data through the entry action of a user. The step of deleting or altering the document name may include a sub-step of encrypting the document name. Also, the step of deleting or altering the document name may include a sub-step of storing the document name in a data area other than its original data area. The program may further comprise a step of displaying on a display a status data indicative of a processing state of the job data on a printer. The status data displayed may contain the document name.

In another aspect of the present invention, there is provided a method of processing a printing job data in a data processor on which a printer driver is installed, comprising the steps of: examining whether the confidential printing for a job data to be printed out is requested or not; when the confidential printing is requested, deleting or altering the document name contained in the job data; and releasing the job data from which the document name has been deleted or altered.

The step of deleting or altering the document name may include a sub-step of encrypting the document name. Also, the step of deleting or altering the document name may include a sub-step of storing the document name in a data area other than its original data area. The method of processing a printing job data may further comprise a step of displaying on a display a status data indicative of a processing state of the job data on a printer. The status data displayed may contain the document name.

In a further aspect of the present invention, there is provided an apparatus for data processing having a display and arranged for transmitting a processed printing job data to a printer, comprising: a setter for setting the confidential printing for a job data; a transmitter controller for transmitting the job data to the printer; a receiver controller for receiving from the printer a status data indicative of a processing state of the job; and a display controller for displaying the received status data on a display, wherein the display controller allows the job data for the confidential printing to display its status data excluding the document name and the job data for no confidential printing to display its status data including the document name.

The apparatus for data processing may further comprise a data processing controller for deleting or altering he document name contained in the job data when the confidential printing is requested, wherein the transmitter controller transmits to the printer the job data in which the document name is deleted or altered.

In a still further aspect of the present invention, there is provided a printing system having at least one data processor equipped with a display and a printer for carrying out a printing action according to a job data received from the data processor. The data processor comprises: a setter for setting the confidential printing for the job data; a first transmitter controller for transmitting the job data to the printer; a receiver controller for receiving from the printer a status data indicative of a processing state of the job; and a display controller for displaying the received status data on a display, wherein the display controller allows the job data for the confidential printing to display its status data excluding the document name and the job data for no confidential printing to display its status data including the document name.

The data processor may further comprise a data processing controller for deleting or altering the document name contained in the job data when the confidential printing is requested. Also, the data processor may further comprise a second transmitter controller for transmitting a command for transmission of the status data to the printer while the printer includes a third transmitter controller for transmitting the status data to the data processor when receiving the command for transmission. It may be arranged that the second transmitter controller transmits the identification data of a user along with the command for transmission of the status data and the third transmitter controller transmits the status data based on the identification data of the user. Moreover, it may be arranged that the first transmitter controller transmits to the printer the job data added with an IP address of the data processor, the second transmitter controller transmits the IP address along with the command for transmission of the status data, and the third transmitter controller transmits the status data of a job data added with an IP address which is identical to the IP address received from the second transmitter controller.

BRIEF DESCRIPTION OF THE DRAWINGS

FIG. 5 is a diagram showing a data structure of the job data produced by the printer driver;

FIG. 14 illustrates an example of the status data screen displayed on a display of the PC according to the third embodiment;

FIG. 15 illustrates another example of the status data screen displayed on the display of the PC according to the third embodiment;

FIG. 16 illustrates a further example of the status data screen displayed on the display of the PC according to the third embodiment;

FIG. 17 illustrates a still further example of the status data screen displayed on the display of the PC according to the third embodiment;

FIG. 23 illustrates an example of the status data screen.

DETAILED DESCRIPTION OF THE INVENTION

Some embodiments of the present invention will be described referring to the accompanying drawings.

First Embodiment

Figure 1:
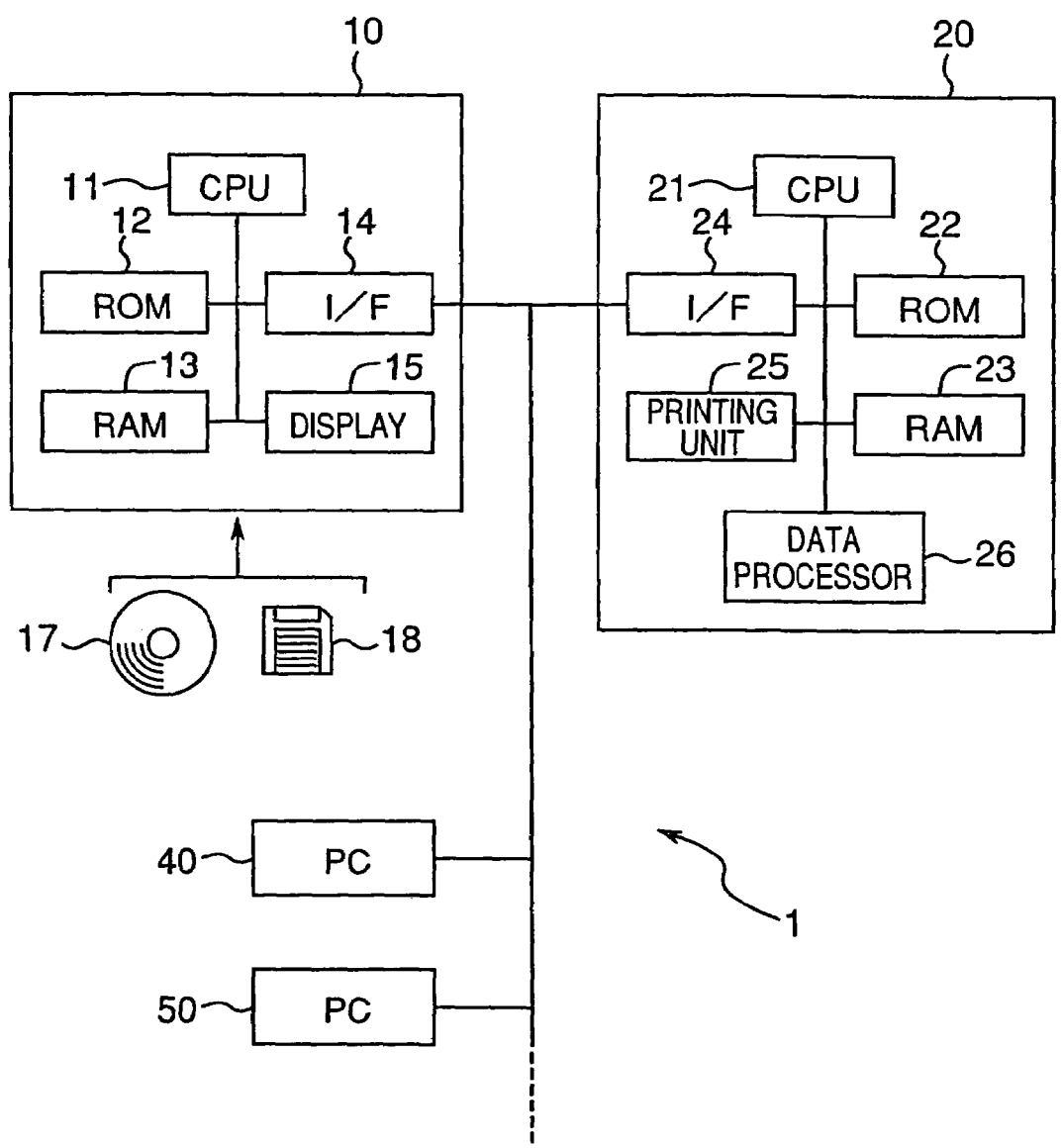
FIG. 1 is a block diagram showing a printing system according to the first embodiment of the present invention.

FIG. 1 illustrates a network including a printing system according to the first embodiment of the present invention. The printing system in the network 1 comprises a plurality of personal computers 10, 40, and 50 (referred to as PCs hereinafter) and a printer 20 for releasing as prints a job data received from the PCs. In the printing system, the single printer 20 is shared by the PCs 10, 40, and 50, and a printer driver is installed on each of PCs for allowing each PC to set a variety of printing conditions and to control the printer 20 in order to identify the printer 20 to which the job data is delivered. The printer driver is a software for controlling the action of the printer which converts text and image data received from an application or OS into a data interpretable with the printer and transmits the interpreted data while monitoring the status of the printer.

As the PC 10 is illustrated in FIG. 1, the other PCs 40 and 50 are identical to the PC 10 and their description will be omitted.

Each of the PCs 10, 40, and 50 in the printing system comprises a CPU 11 for sequentially controlling the PC, a ROM 12 for recording a program of the sequential control by CPU 11, a RAM 13 used as a buffer area for a work area required for executing the program, an interface (denoted by I/F throughout the drawings) 14 for receiving/transmitting data from/to the printer 20, and a display 15 for displaying a setting screen and a data screen determined by the printer driver.

The printer 20 comprises a CPU 21 for sequentially controlling the printer, a ROM 22 for recording a program of the sequential control by CPU 21, a RAM 23 used as a work area required for the program and a buffer area for the job data received from the PCs 10, 40, and 50, an interface (denoted by I/F throughout the drawings) 24 for receiving/transmitting data from/to the PC 10, a printing unit 25 for producing paper prints according to the job data, and a data processor 26 for processing the data with a variety of data processing such as color spatial conversion or binarization.

Figures 2, 3:
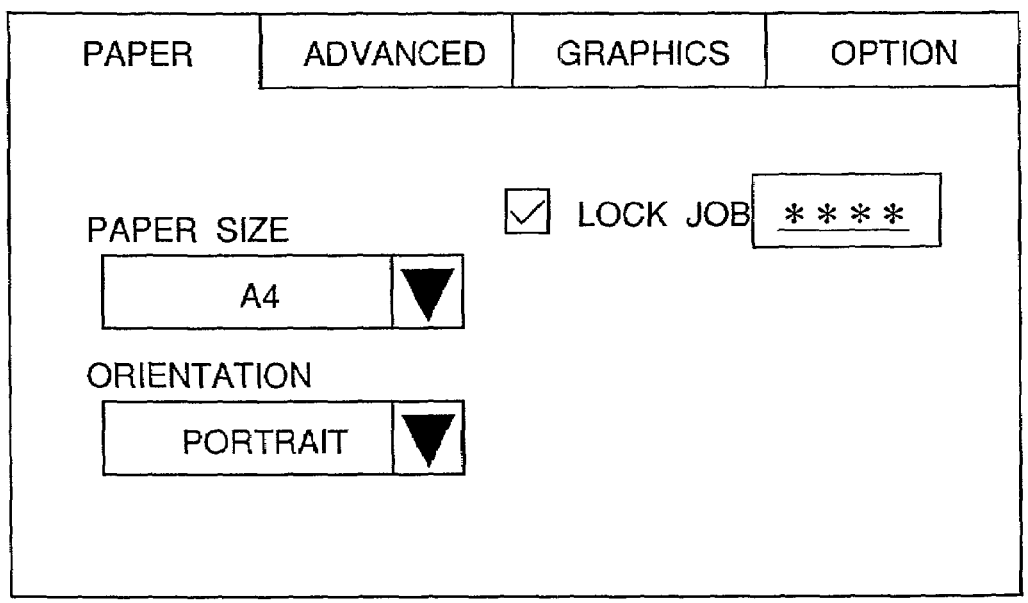
FIG. 2 is a view of a setting screen for a printer driver installed in a PC provided in the printing system.
FIG. 3 is a view of a status display screen on a printer controlled by the printer driver.

When the printer driver installed on each of the PCs 10, 40, and 50 starts its action in response to the printing command in an application software, the setting screen such as shown in FIG. 2 is displayed on the display 15. This allows the user to set the printing conditions including the paper size to be used ("PAPER SIZE" in FIG. 2) and the image orientation ("ORIENTATION" in FIG. 2). This also allows the user to select a confidential printing. If the confidential printing is selected, the user may tag the job data with a password, and then the job data is transmitted to printer 20. Accordingly, when printer 20 is provided with the same password entered, its printing action will start. In the state as shown in FIG. 2, the check blank in front of "LOCK JOB" is checked to select the confidential printing mode. At the confidential printing mode, the password is typed in the blank behind "LOCK JOB". On the illustrated setting screen, the check blank in front of "LOCK JOB" is not checked by default, and therefore "common printing" will be performed on printer 20.

The printer driver may obtain through the network 1 the data indicative of status for the printer 20 including its action mode, the printing state of the job data, and the error, and the data indicative of status for optional equipments (e.g. a duplex printing unit and a finisher) including the existence of optional equipments connected to printer 20 and the errors. The status data for the printer 20 and optional equipments may be displayed on the display 15 of each PC 10, 40, or 50 if desired by the user. One of screens representing the status data for printer 20 and optional equipments (a status data screen) is the screen representing the printing state of the job data transmitted from the PC 10, 40, or 50 as shown in FIG. 3. The screen exhibits the document data (the name of a data file such as the printing or image data), the owner name (the name of a user requesting the printing of the job), and the printing registration time for the job data as well as the printing state (printing or standby). As will be described later in more detail, in this embodiment, if the confidential printing has been selected on the setting screen of printer driver, the status data screen can be controlled such that the document name of the job data is deleted on the status data screen.

Figure 4:
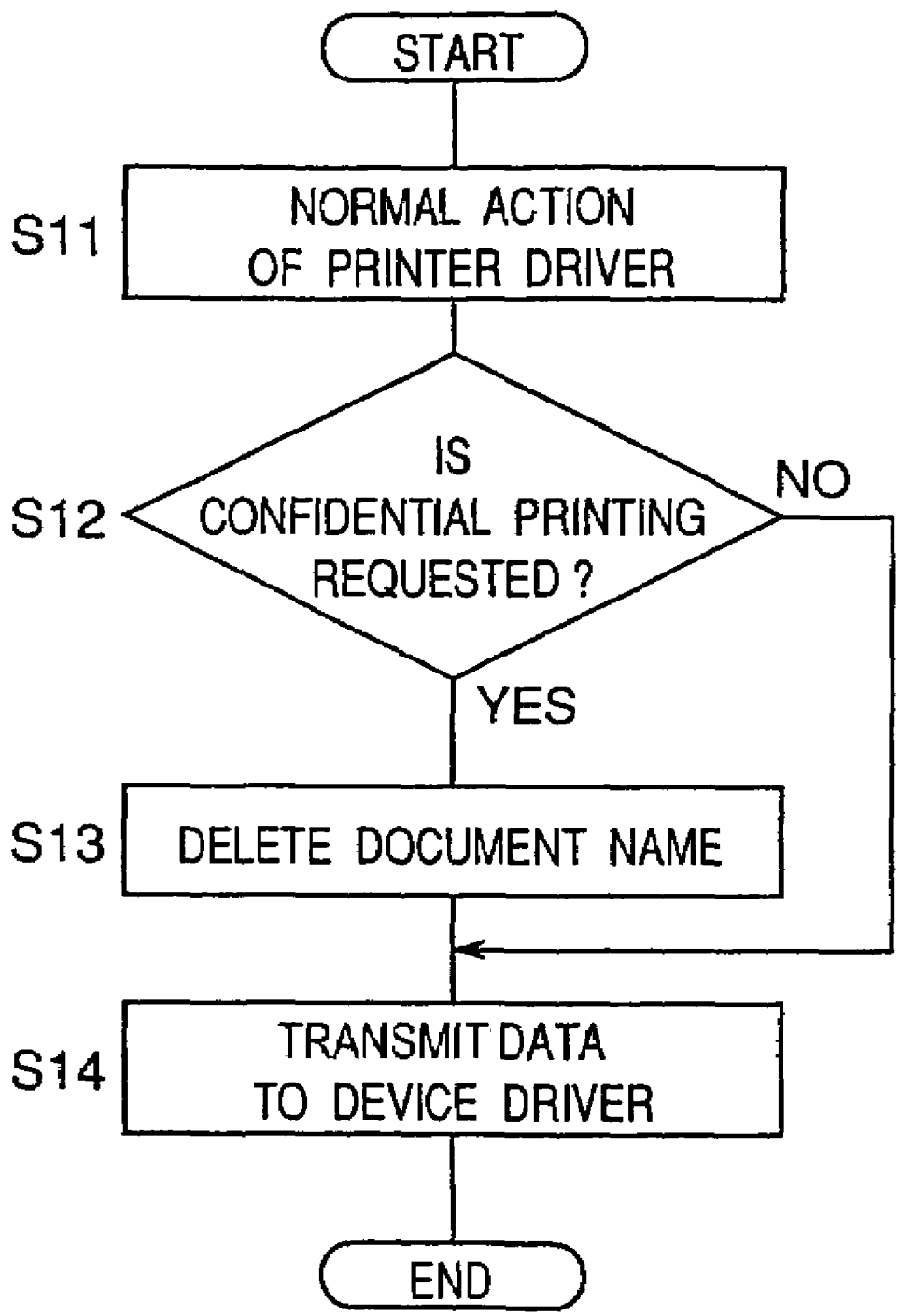
FIG. 4 is a flowchart showing procedure based on functions of the printer driver.

FIG. 4 is a flowchart showing procedure based on functions of the printer driver installed on the PC 10 according to the first embodiment of the present invention. The procedure starts with a common function of the printer driver initialized in response to the printing command of an application software, which is based on the setting conditions determined by the user (S 11). As a result of this function, the job data having the data structure as shown in FIG. 5 is obtained. The job data is composed of the document name and the image data received from the application software, and the printing conditions (e.g. the number of prints), which are determined by the user at the setting screen of the printer driver. An architecture of the job data comprises a header containing the data indicative of "owner name", "document name", and "original size", and a main field containing the image data.

This is followed by S12 where it is examined whether a command for the confidential printing is provided or not on the setting screen. When so, the document name is deleted from the job data (S13) and the job data is transmitted to a device driver (S14). If it is judged at S12 that the command for the confidential printing is not provided or a common printing is setting, the procedure goes to S14 where the job data is transmitted to the device driver without deleting the document name. Then, the device driver transmits the job data to the printer 20 and the procedure is terminated.

Figure 6:
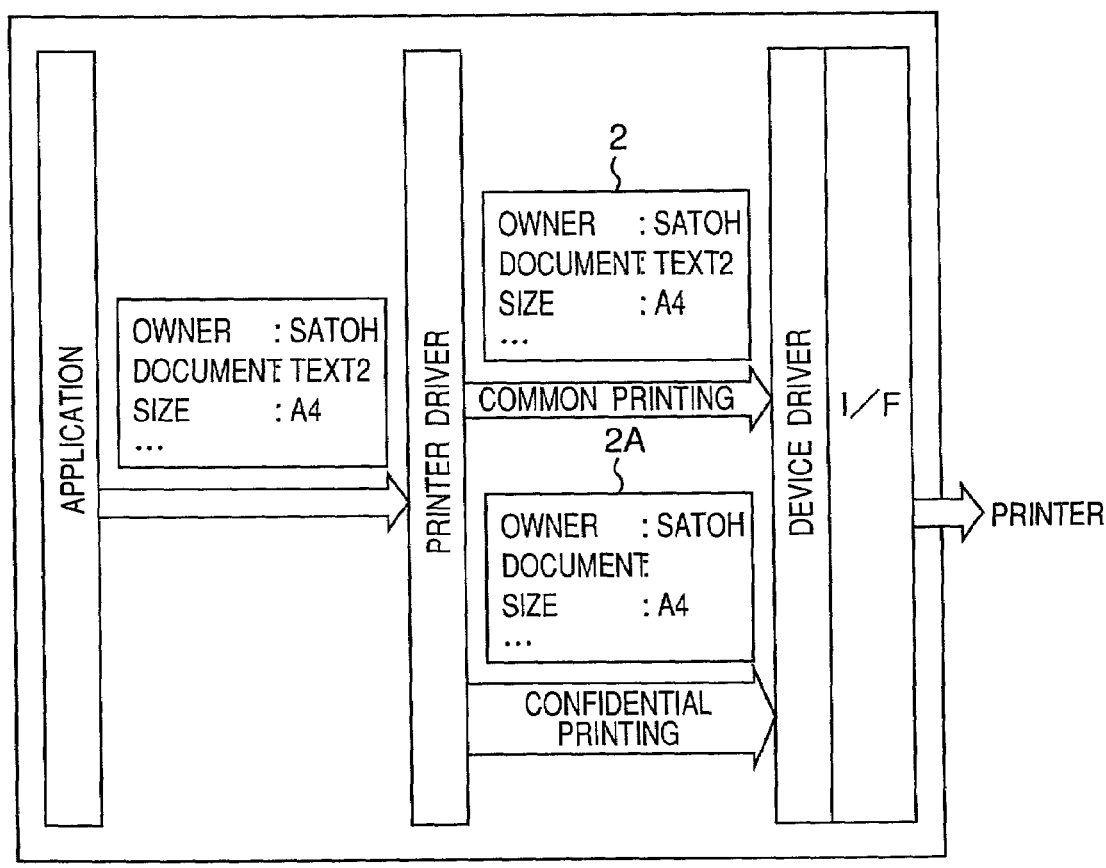
FIG. 6 is a diagram schematically illustrating functions of the printer driver.

FIG. 6 is an explanatory view schematically illustrating the procedure of the flowchart of FIG. 4. When the common printing is setting, the printer driver installed on each PC 10, 40, or 50 transmits the job data 2 received from an application software without deleting the document name to the device driver. Alternatively, when the confidential printing is setting, the document name is deleted and then a job data 2A including no document name is transmitted to the device driver.

As a result, the display 15 of each PC 10, 40, or 50 exhibits a status data screen (FIG. 3) where assuming that the three PCs 10, 40, and 50 are operated by three individuals, Suzuki, Satoh, and Tanaka, the common printing is conducted by Suzuki and Tanaka while both the common and confidential printings are conducted by Satoh. The status data screen indicates the document names, owner names, and printing registration times of the job data provided by the PCs 10, 40, and 50 to the printer 20 and arranged in an order of printing. The job data No.1 is provided by Suzuki and now in printing ("PRINTING"). The job data No.1 is set with the common printing mode and "TEXT 1" is displayed as its document name.

Similarly, the job data No.2 to No.4 are provided by Satoh, Tanaka, and Satoh respectively as in a waiting state ("WAITING"). The job data No.2 is set with the confidential printing mode and its document name is not displayed. The job data No.3 and No.4 are set with the common printing mode and "TEXT 3" and "TEXT 4" are displayed as their document names respectively.

Therefore, the job data provided by a PC for the confidential printing can be inhibited from exhibiting its document name on the status data screen. The job data will not be estimated from its document name, thus being improved in the secrecy.

Second Embodiment

A printing system according to the second embodiment of the present invention is adapted where when the confidential printing is selected by the printer driver in a PC, the document name of a job data is encrypted by the printer driver before the job data is transmitted to the printer, and is decrypted at the printer. This action will now be explained in more detail. The printing system of the second embodiment is substantially identical to that of the first embodiment and will thus be described referring to FIG. 1.

This printing system has a function provided in each PC 10, 40, or 50 for encrypting the document name of a particular job selected for the confidential printing by the user operating the printer driver. In turn, the printer 20 has a program stored in the ROM 22 for decryption of the document name.

Figure 7:
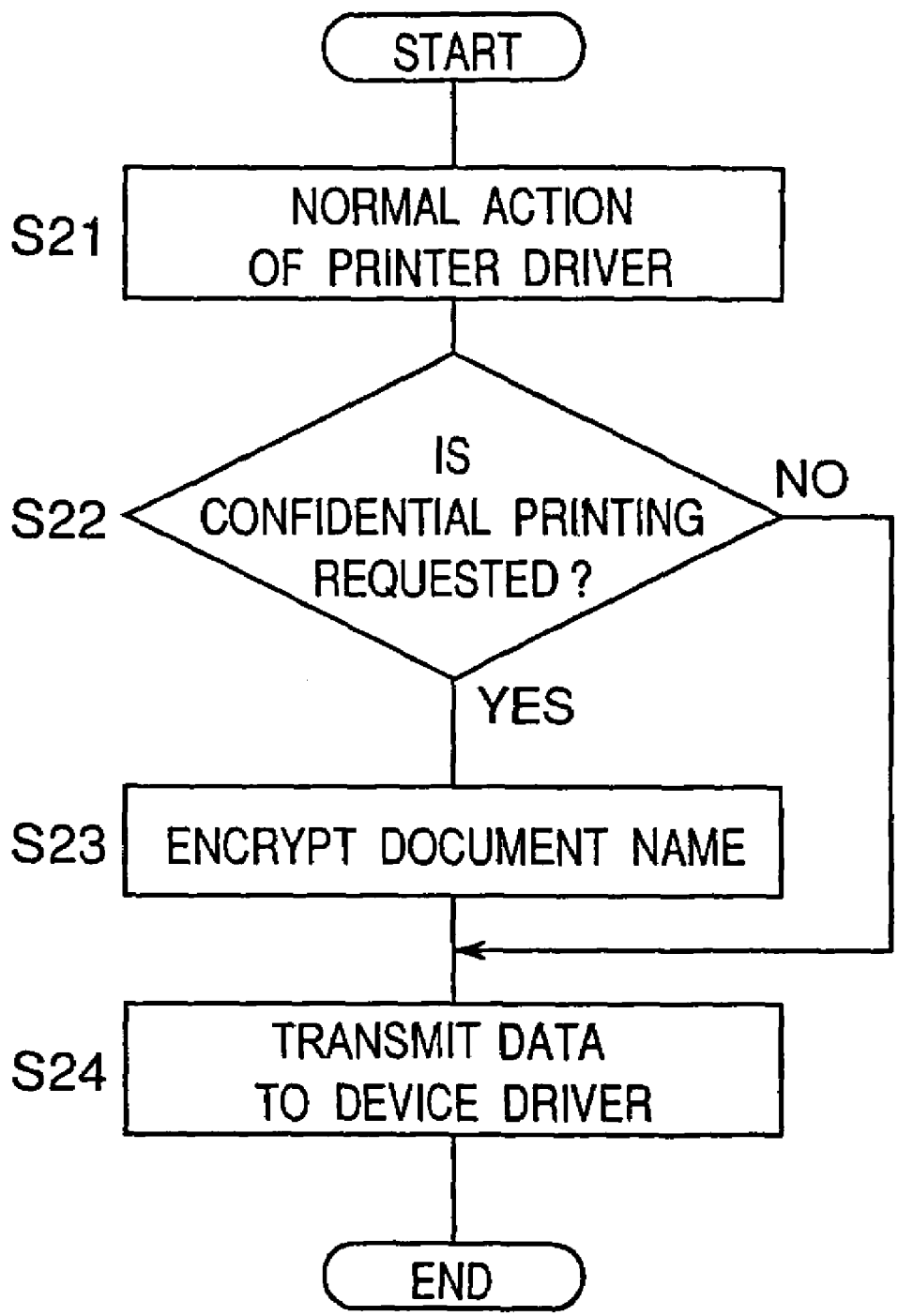
FIG. 7 is a flowchart showing a procedure of actions of the printer driver installed on a PC provided in a printing system according to the second embodiment of the present invention.

FIG. 7 is a flowchart showing a procedure of actions of the printer driver in the PC 10 according to the second embodiment. The procedure starts with the printer driver initiated in response to the printing command of an application software to carry out a common action determined by the user operating the printer driver (S21). It is then examined at S22 whether the command for the confidential printing is received or not on the printer driver setting screen (See FIG. 2). When so, the document name of the job is encrypted (S23) and transmitted to the device driver (S24). If it is judged at S22 that the command for the confidential printing is not received or the common printing mode is selected, the procedure jumps to S24 where the job data is directly transmitted to the device driver without encrypting its document name. Then, the job data is transmitted from the device driver to the printer 20 and this procedure is terminated.

Figure 8:
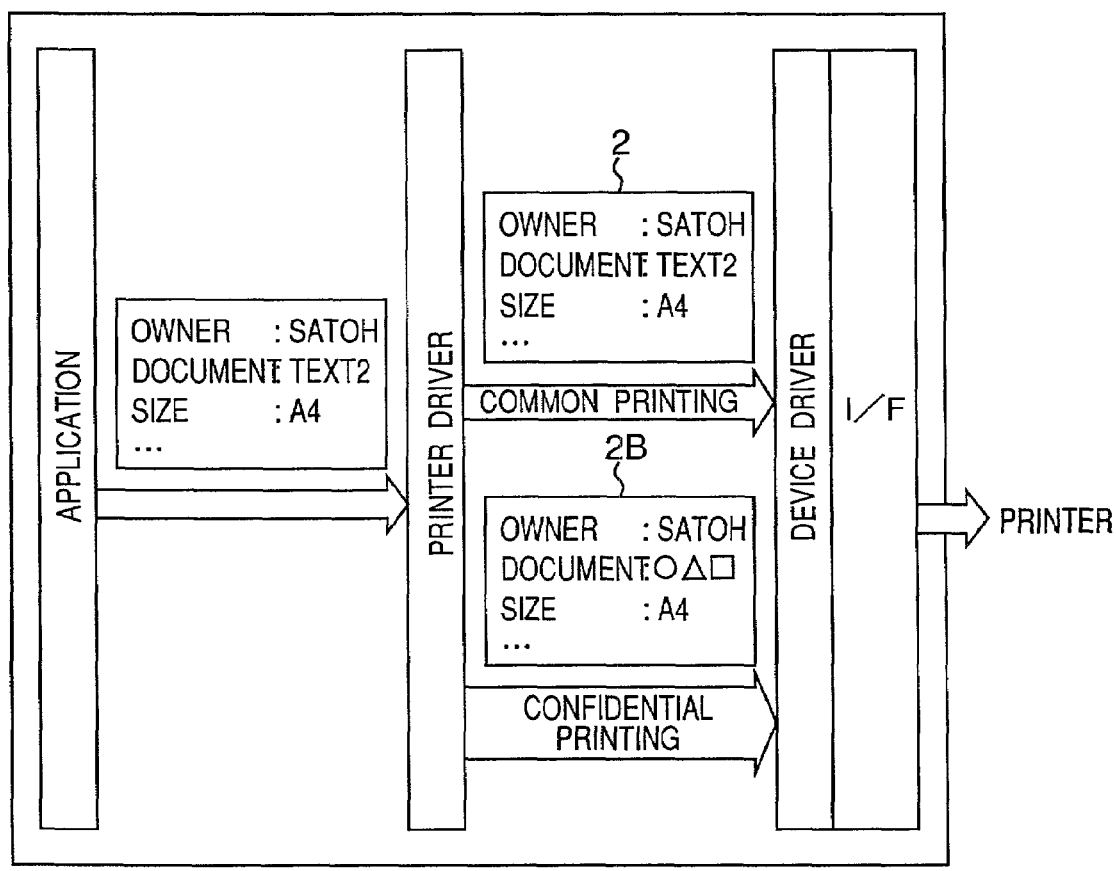
FIG. 8 is a diagram schematically illustrating functions of the printer driver according to the second embodiment.

FIG. 8 is an explanatory view schematically showing the procedure of the flowchart of FIG. 7. When receiving from an application software a job data 2 provided for the common printing, the printer driver installed on each PC 10, 40, or 50 transmits it with document name as it is to the device drive without encrypting its document name. Alternatively, when the job data is provided for the confidential printing, its document name is encrypted and a job data 2B is transmitted to the device driver.

Figure 9:
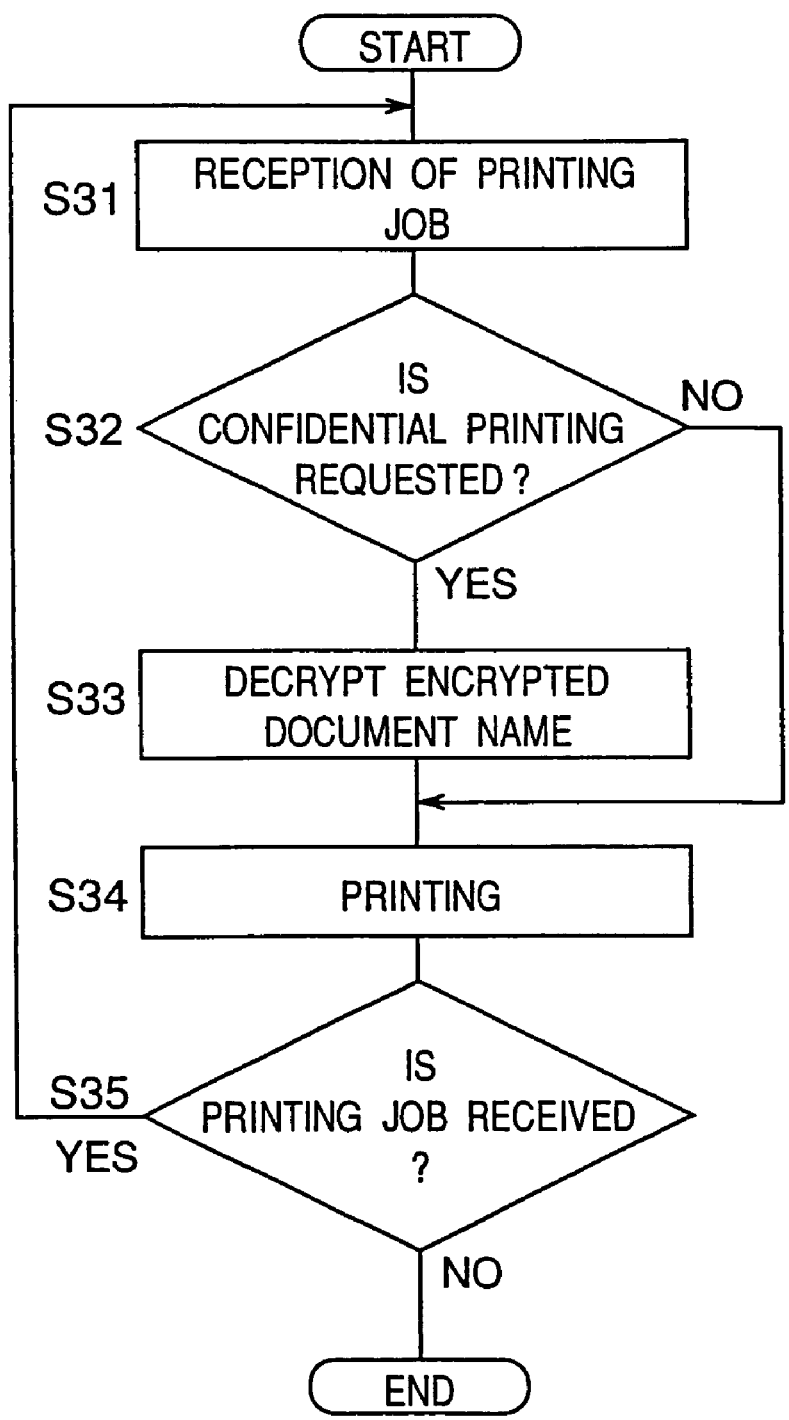
FIG. 9 is a flowchart showing a procedure of printing actions of a printer according to the second embodiment.

FIG. 9 is a flowchart illustrating a printing procedure of the printer 20 controlled by the printer driver shown in FIG. 7. This procedure starts with receiving a job data (S31) and examining whether or not it is provided for the confidential printing (S32). When the job data is provided for the confidential printing, its document name is decrypted (S33) and the procedure goes to S34. When it is judged at S32 that the job data is provided not for the confidential printing, the procedure jumps to S34. At S34, the printing process is carried out and it is then examined at S35 whether another job data is received or not. If not, the procedure is terminated. When it is judged that the another job data is received, the procedure returns back to S31 and repeats the above described steps.

In the second embodiment, the document name of a job data may be encrypted by Caesar encoding. The Caesar encoding permits each original character in a text such as an Alphabet, a Japanese Hiragana, or a numeral to be replaced by another character which shifts backward from the original character by a given number of characters. For example, when the Caesar encoding is made by shifting two characters backward, "CAP" is expressed by "ECR".

Figure 10:
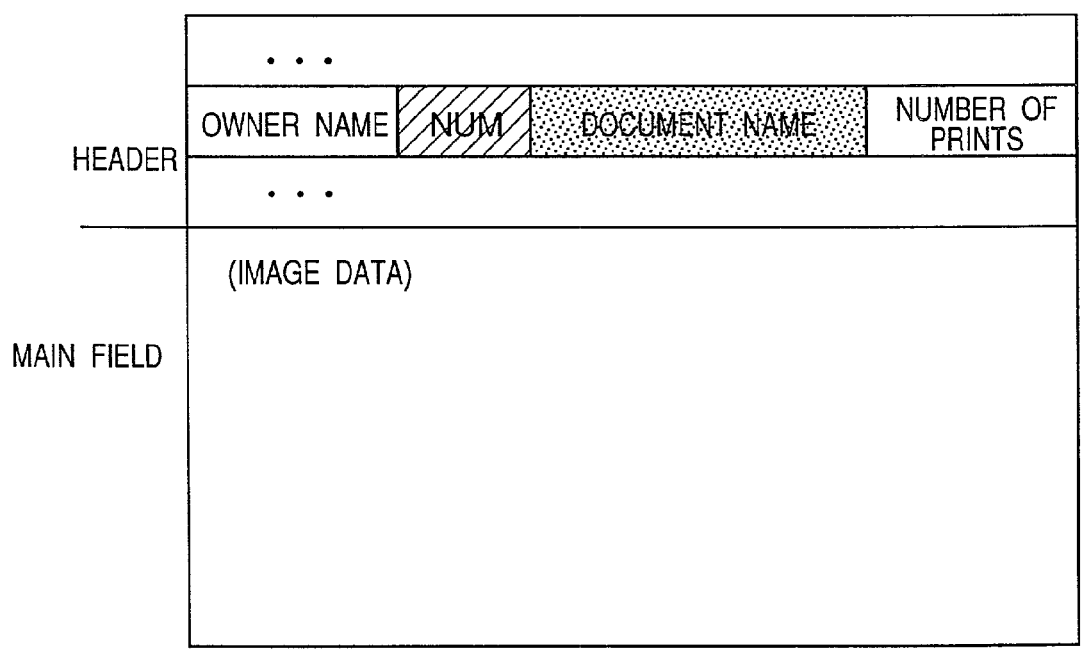
FIG. 10 is a diagram showing a data structure of the job data produced by the printer driver according to the second embodiment.

Like the first embodiment, an image data and its document name received from an application software are accompanied with relevant printing conditions such as the number of prints which are entered by the user through the print setting screen of the printer driver thus to construct a job data having a data structure shown in FIG. 10. The job data according to the second embodiment has a header arranged to contain the data indicative of "owner name", "document name", "original size" and an extra data of "NUM" indicative of the shift number of characters for the Caesar encoding. The "document name" in the header is encrypted by shifting the characters of the name according to "NUM".

In the second embodiment, the "NUM" may arbitrarily be determined by the user. When the common printing is desired, the "NUM" is automatically turned to zero. In case that the encryption is based on the ASCII coding or the JIS coding, the characters of the document name are not limited to the Alphabets, the Japanese Hiraganas, or the numerals but may be symbols or Chinese characters.

Figure 11:
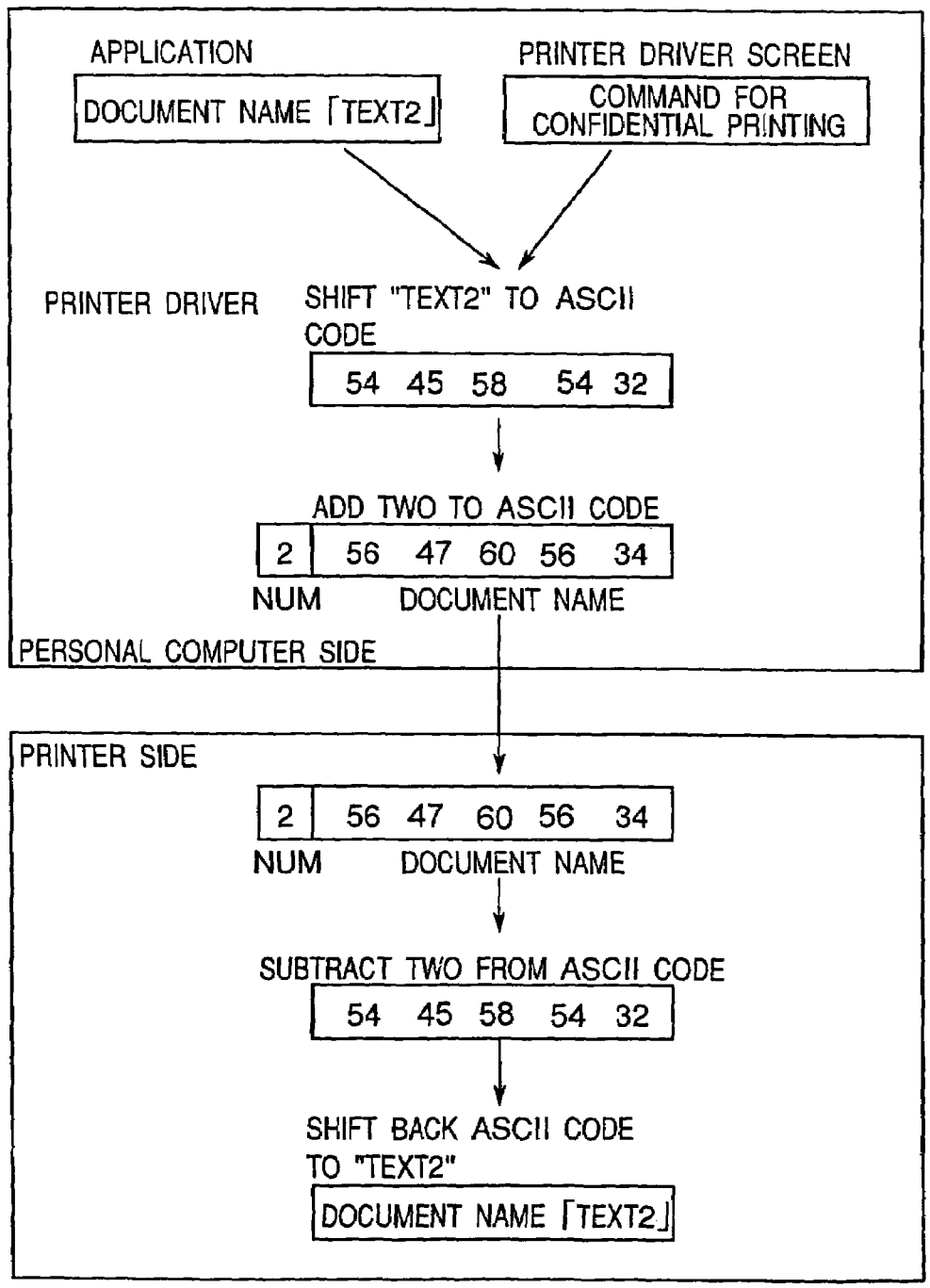
FIG. 11 is an explanatory view showing an encryption process and a decryption process in the printing system of the second embodiment.

FIG. 11 illustrates actions for encryption by the Caesar encoding in the PC and for decryption of the encrypted document name such as "TEXT 2" of the ASCII coding in the printer. In the PC, the document name "TEXT 2" of the ASCII coding is converted by the function of the printer driver into an ASCII code "54 45 58 54 32" when the confidential printing is selected. When having been converted, the ASCII code is shifted by two based on "NUM". The document name is hence encrypted to "56 67 7A 76 34". The document name is expressed by "VGZV4" on the ASCII coding. The document name in the encrypted form is then transmitted from the PC to the printer.

At the printer, the document name "56 47 60 56 34" is returned back to its original ASCII form "54 45 58 54 32" by the subtraction of two based on "NUM". As the result, the document name "TEXT 2" in the ASCII form is reconstructed. Then, the printer receives the document name "TEXT 2".

Therefore, the document name of a job data is encrypted by the printer driver in the PC when the confidential printing is desired and then transmitted to the printer where it is duly decrypted. While the encrypted form of its document name is conveyed from the PC to the printer, the job data will be hardly guessed. Accordingly, the secrecy of the job data can be maintained.

While the document name is subjected to the encryption in the second embodiment, it may simply be modified to another name without being encrypted.

Third Embodiment

In a printing system of the third embodiment of the present invention, a job data provided in the printer 20 for the confidential printing can, while being displayed on the status data screen, be modified by any viewer at the PC 10, 40, or 50, such as the owner of the job data, another user, or a manager for the printer. As will be described referring to FIGS. 12 to 17, the modification is carried out at the action mode which is displayed in the status data screen as classified into two modes, "owner & manager mode" selected when the viewer is either the owner of the job data or the manager for the printer 20, and "normal mode" selected in any other case. The "owner & manager mode" further includes a function for the user entering "user name" and "password". In the printer 20, it is examined from the display mode, user name, and password determined at the PC 10, 40, or 50 whether the viewer demanding the status data screen is the owner of the job data, the other user, or the manager for the printer. The status data screen for exhibiting corresponding requirements can thus be received by the owner of the job data, the other user, or the manager for the printer at the PC 10, 40, or 50.

Figure 12:
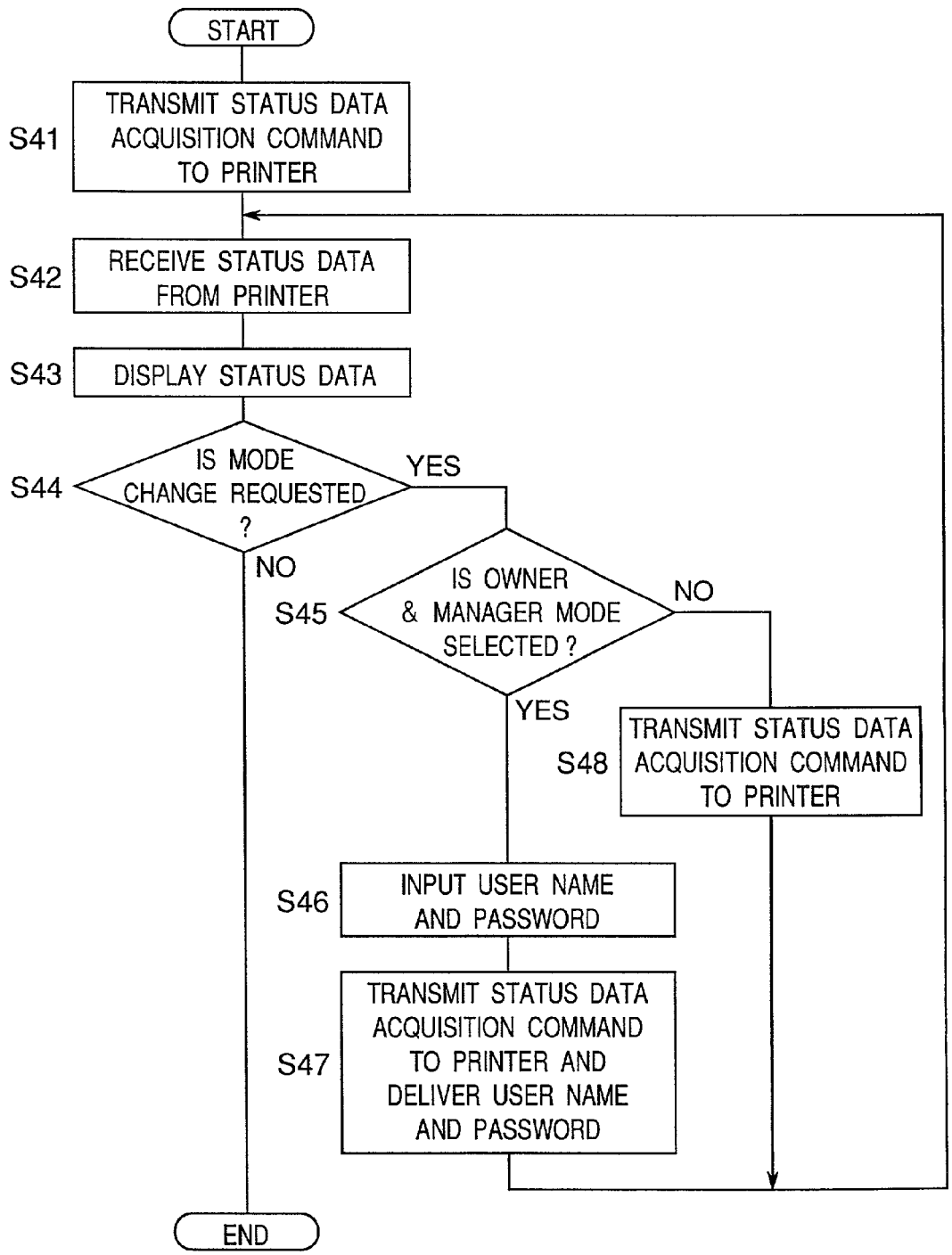
FIG. 12 is a flowchart showing a procedure of status data displaying actions of the printer driver installed on a PC provided in a printing system according to the third embodiment of the present invention.

FIG. 12 is a flowchart showing a procedure of status data displaying actions at the printer 20 according to the third embodiment of the present invention. The procedure starts with transmitting a command for acquisition of the status data from the PC 10, 40, or 50 to the printer 20 (S41). As the status data is received from the printer 20 (S42), its status data screen is displayed on the display 30 of the PC 10, 40, or 50 (S43). It is then examined whether a command for changing the display mode in the status data screen is provided or not (S44). If not, the procedure is terminated. When it is judged that the command for changing the display mode is provided, the procedure goes to S45 for examining whether the display mode in the status data screen is "owner & manager mode" or not. When it is judged that the display mode is "owner & manager mode", the procedure advances to S46 where the user name and the password entered at the setting of "owner & manager mode" are identified. The user name and the password are then transmitted to the printer 20 together with the command for acquisition of the status data screen (S47). The procedure returns back to S42 and the above described steps are repeated. When it is judged at S45 that the display mode is not "owner & manager mode" (but "normal mode"), the command for acquisition of the status data screen is transmitted to the printer 20 (S48). The procedure returns back to S42 and the same steps are repeated.

Figure 13:
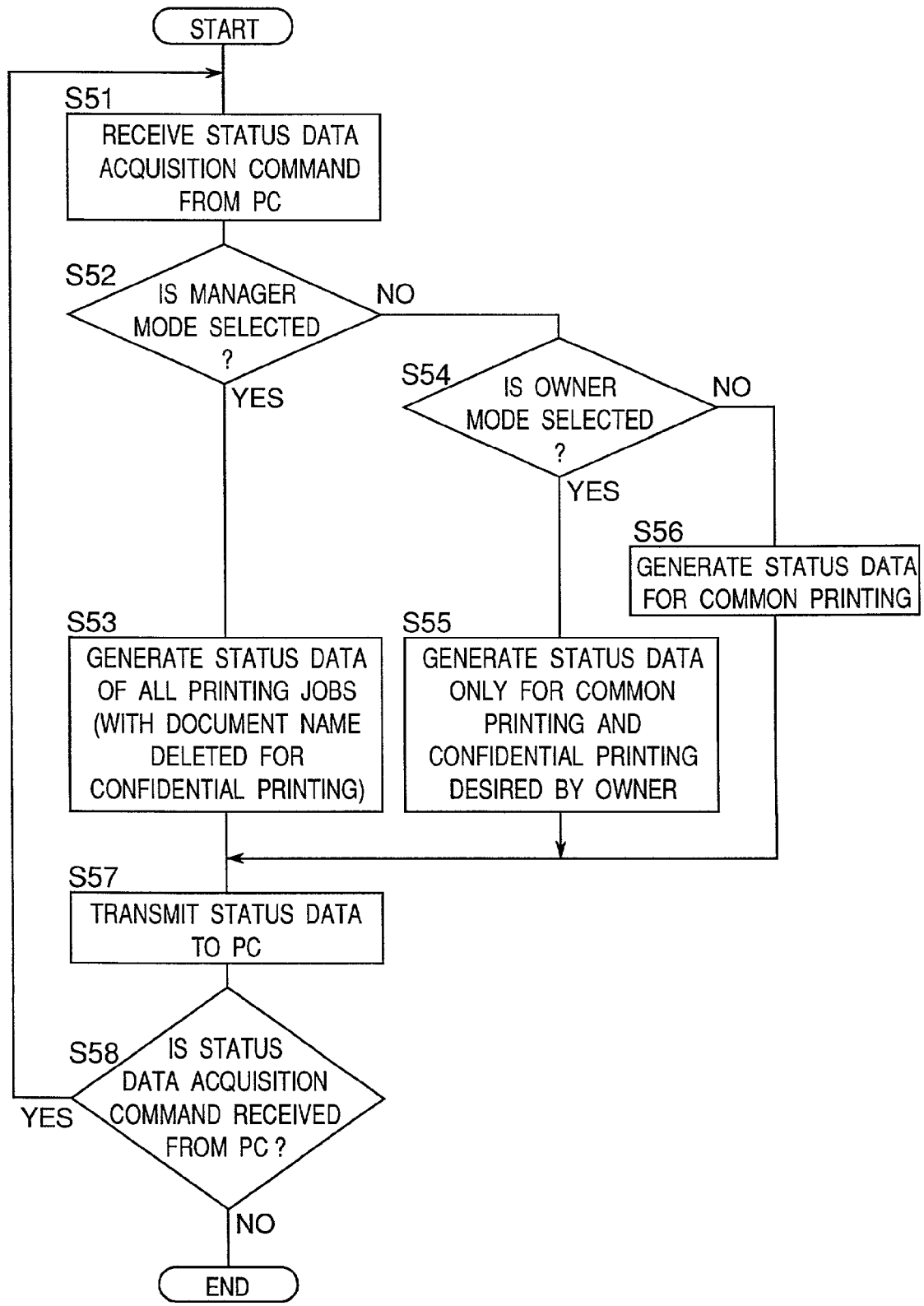
FIG. 13 is a flowchart showing a procedure of status data transmitting actions of a printer according to the third embodiment.

FIG. 13 is a flowchart showing a procedure of status data transmitting actions at the printer 20 according to the third embodiment. The procedure starts with receiving the command for acquisition of the status data from the PC 10, 40, or 50 (S51). It is then examined from the display mode, user name, and password determined by the PC 10, 40, or 50 whether the display mode is "manager mode" or not (S52). It is judged that the display mode is "manager mode" only when the user name and the password entered at the setting of "owner & manager mode" in the PC 10, 40, or 50 are identical to the manager name for the printer 20 and its password registered in the RAM 23 of the printer 20.

When it is judged at S52 that the display mode is "manager mode", the procedure goes to S53 where the status data of all job data in printing and waiting in the printer 20 are produced. Simultaneously, the document name of the job data provided for the confidential printing is deleted. This is followed by S57. When it is judged at S52 that the display mode is not "manager mode", the procedure goes to S54 for examining whether the display mode is "owner mode" or not. It is judged that the display mode is "owner mode" only when the user name and the password entered at the setting of "owner & manager mode" in the PC 10, 40, or 50 are identical to the owner name of the PC and its password registered in the RAM 23 of the printer 20.

When it is judged at S54 that the display mode is "owner mode", the procedure goes to S55 where the status data of the job data in printing and waiting in the printer 20 are generated. The status data of all the job data provided for the common printing and of the owner provided for the confidential printing are generated. This is followed by S57. When it is judged at S54 that the display mode is not "owner mode" (but "normal mode"), the status data of the job data provided for the common printing are produced at S56. Then, the procedure advances to S57.

At S57, the status data of the job data generated at each of the steps S53, S55, and S56 are transmitted to the PC which provides the command for acquisition of the status data. At S58, it is then examined whether the command for acquisition of the status data from the PC 10, 40, or 50 is duly received or not. When so, the procedure returns back to S51 and the foregoing steps are repeated. When it is judged at S57 that the command is not received, the procedure is terminated.

Assuming that the PCs 10, 40, and 50 are operated by three individuals, Suzuki, Satoh, and Tanaka respectively with the printer 20 receiving the job data for both the common printing and the confidential printing, examples of the status data screen displayed on the display 13 of each of the PCs 10, 40, and 50 will be explained referring to FIGS. 14 to 17. The printer 20 receives the three job data No.1, No.2 and No.3. More specifically, the job data No.1 for the common printing is provided by Suzuki operating the PC 10 and its document name is "TEXT 1". Similarly, the job data No.2 for the confidential printing is provided by Suzuki operating the PC 10 and its document name is "TEXT 2". The job data No.3 for the confidential printing is provided by Satoh operating the PC 40 and its document name is "TEXT 3".

FIG. 14 illustrates an example of the status data screen at the normal mode displayed on the PC 10 as arranged accessible to Suzuki. As the screen at the normal mode is determined by the printer 20 to be accessible to the user, not the owner or the manager, it only displays the job data No.1 for the common printing.

FIG. 15 illustrates an example of the status data screen at the owner & manager mode displayed on the PC 10 as arranged accessible to Suzuki. As the screen at the owner & manager mode with the user name and the password filled is determined by the printer 20 to be accessible to the owner, it displays the job data No.1 for the common printing and the job data No.2 for the confidential printing requested by the owner (i.e. Suzuki). The sign "LOCK" in front of "Status" indicates that the job data is provided for the confidential printing.

FIG. 16 illustrates an example of the status data screen at the owner & manager mode displayed on the PC 50 as arranged accessible to Tanaka. As the job data for Tanaka doesn't exist and it is determined by printer 20 that viewer is not owner or manager while the owner & manager mode is selected and user name and the password are entered, the status data screen displays the job data No.1 for the common printing.

FIG. 17 illustrates an example of the status data screen at the owner & manager mode displayed on the PC as arranged accessible to the manager for the printer 20 but not Suzuki, Satoh, or Tanaka. As the owner & manager mode is set and the user name and the password are entered, and it is determined by printer 20 that viewer is the manager for printer 20, the status data screen displays the job data No.1 to No.3. The document names of the job data No.1 and No.2 provided for the confidential printing are not displayed.

Therefore, the job data provided for the confidential printing is displayed only when the viewer for the status data screen is the owner or the manager. When the viewer is the manager, the document name of each job data is not displayed. As no document name of the job data is accessible by any other viewer than the owner, the contents of the job data will be hardly guessed. Accordingly, the secrecy of the job data will be improved.

Fourth Embodiment

A printing system according to the fourth embodiment of the present invention allows the printer driver of each PC to assign the document name of a job data to another form when the confidential printing is selected in the printer driver. More particularly, the document name of the job data is moved from its original storage area to another area in the data structure and it can be retrieved in the printer to which the job data has been transmitted. In the fourth embodiment, the IP address of each PC is added to the job data produced by the printer driver of the PC and when the IP address of a confidential print is identical to that of the PC, the status data is displayed on the display of the PC. Those functions will be described in more detail.

Figure 18:
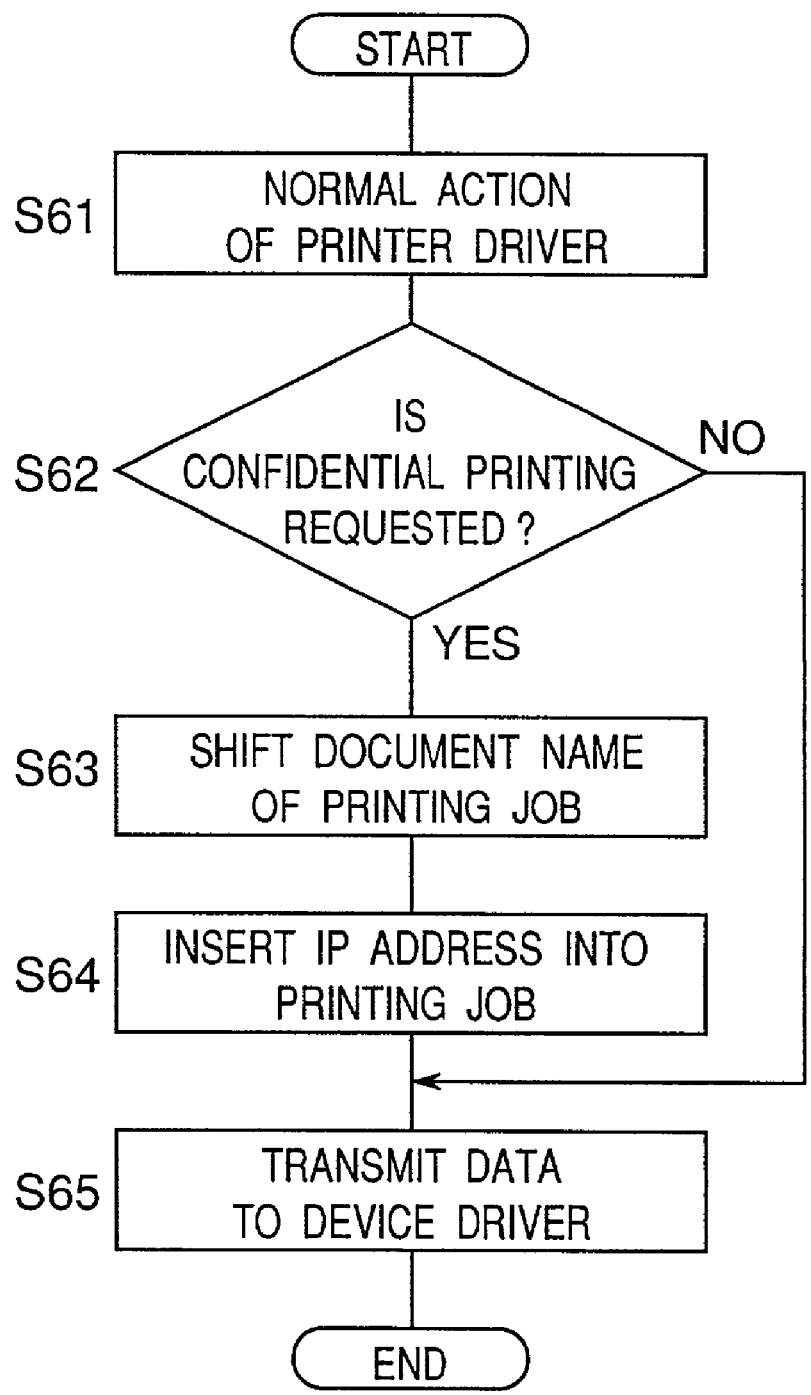
FIG. 18 is a flowchart showing a procedure of actions of the printer driver installed on a PC provided in a printing system according to the fourth embodiment of the present invention.

FIG. 18 is a flowchart showing a procedure of functions of the printer driver in the PC 10 according to the fourth embodiment. The procedure starts with carrying a common action of the printer driver, which is initiated in response to the printing command of an application software, according to the conditions determined by the user (S61). A job data having a predetermined construction is produced from the document name and the image data received from the application software and the printing conditions such as the number of prints determined by the user operating the printer driver at the setting screen.

Figure 19:
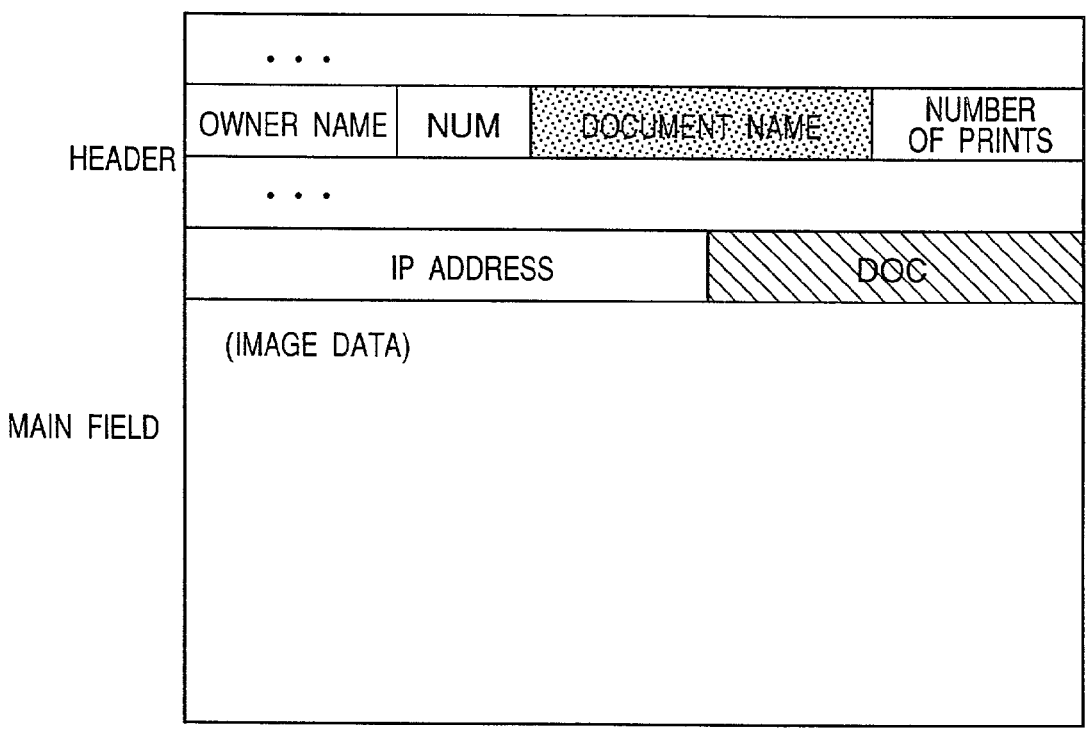
FIG. 19 is a flowchart showing a procedure of printing actions of a printer according to the fourth embodiment.

It is then examined at S62 whether a command for the confidential printing is provided or not on the setting screen of the printer driver. When so, the document name of the job data is moved from its original area for the common printing to another area in the data structure of the job data (S63). Also, the IP address is inserted into the job data (S64). As a result, the data structure of the job data is modified as shown in FIG. 19. "NUM" in the job data is used for examining at S62 whether the command for the confidential printing is provided or not. When the "NUM" is 0, the common printing is selected. When the "NUM" is 1, the confidential printing is required. As the confidential printing is selected, the document name of the job data is shifted from its original area denoted by "document name" to another area of the data structure denoted by "DOC" as shown in FIG. 19. Also, the area denoted by "IP address" in the data structure contains the IP address of the PC. When the common printing is desired, the document name of the job data remains held in the "document name" area and the IP address of the PC is not provided.

After the IP address of the PC is inserted into the job data at S64, the job data is transmitted to the device driver (S65). If it is judged at S62 that the confidential printing is not commanded or the common printing is desired, the procedure jumps to S65 for transmitting the job data to the device driver. Then, when the job data has been transmitted from the device driver to the printer 20, the procedure is terminated.

Therefore, the document name of the job data is moved from its original area for the common printing to another area of the data structure when the confidential printing is selected before the job data is transmitted to the printer 20. This inhibits the document name of the job data from being identified while being conveyed from the PC 10, 40, or 50 to the printer 20. Accordingly, the contents of the job data will be hardly guessed from its document name and its secrecy can thus be ensured.

Figure 20:
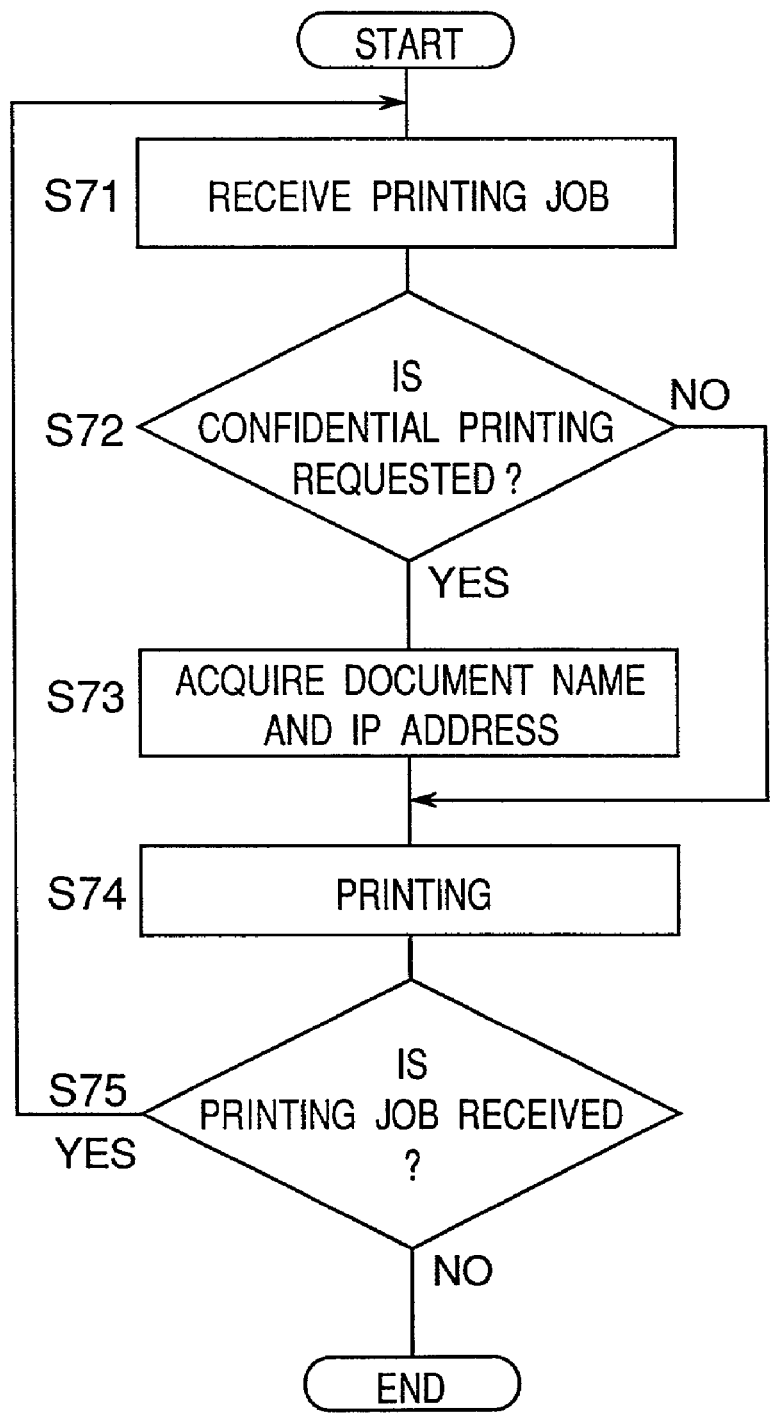
FIG. 20 is a flowchart showing a procedure of printing actions of the printer controlled by the action of the printer driver shown in FIG. 18.

FIG. 20 is a flowchart showing a procedure of printing actions of the printer 20 carried out according to the action of the printer driver shown in FIG. 18. The procedure starts with receiving a job data (S71) and examining whether the confidential printing is selected or not (S72). When so, the document name and the IP address in the job data are obtained (S73) and the procedure goes to S74. When it is judged at S72 that the confidential printing not required, the procedure jumps to S74. At S74, the printing is carried out. It is then examined at S75 whether another job data is received or not. If not, the procedure is terminated. When it is judged that the another job data is received, the procedure returns back to S71 for repeating the foregoing steps.

Figure 21:
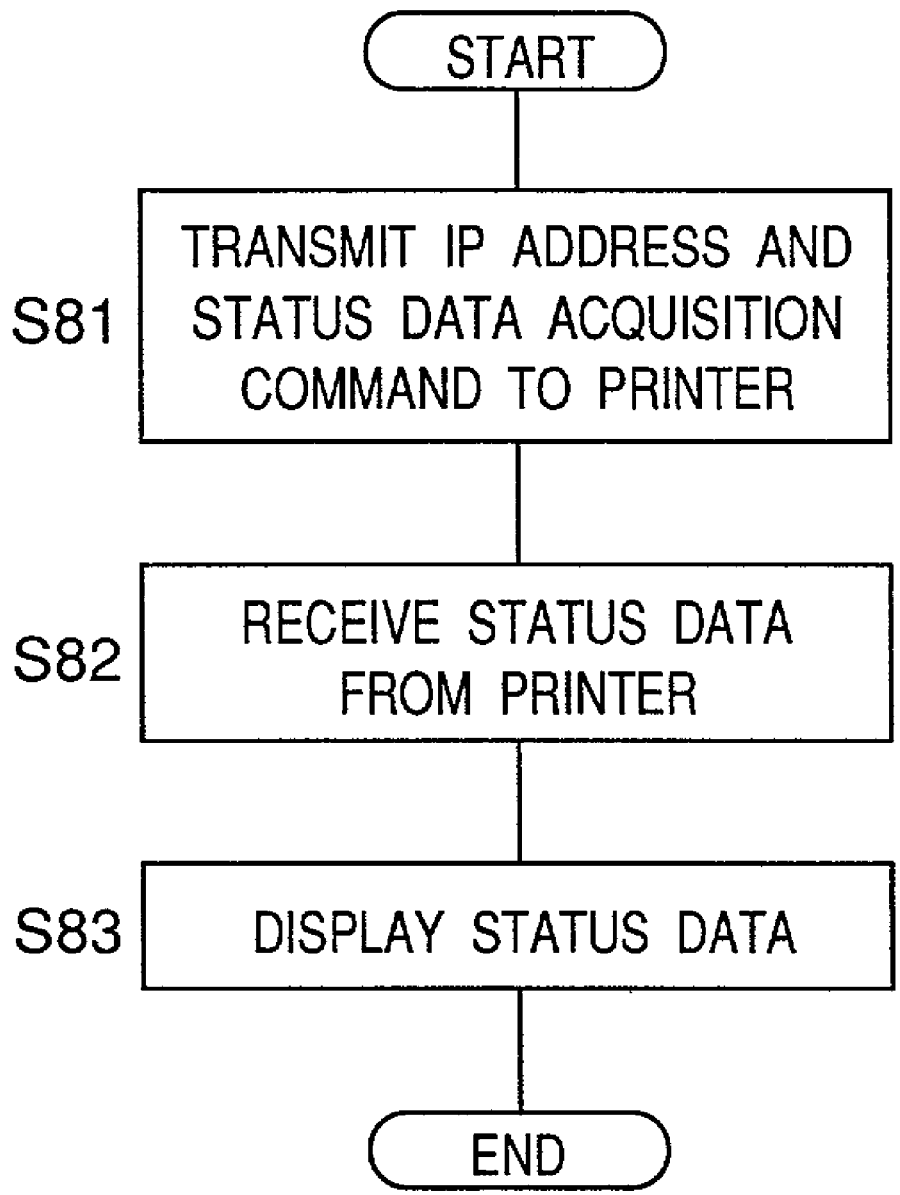
FIG. 21 is a flowchart showing a procedure of status data displaying actions of the PC according to the fourth embodiment.

FIG. 21 is a flowchart showing a procedure of PC status data displaying actions according to the fourth embodiment. The procedure starts with transmitting a command for acquisition of the IP address and status data of the PC from the PC 10, 40, or 50 to the printer 20 (S81). When the status data is received from the printer 20 (S82), the status data screen is displayed on the display 13 of the PC 10, 40, or 50 (S83). The procedure is then terminated.

Figure 22:
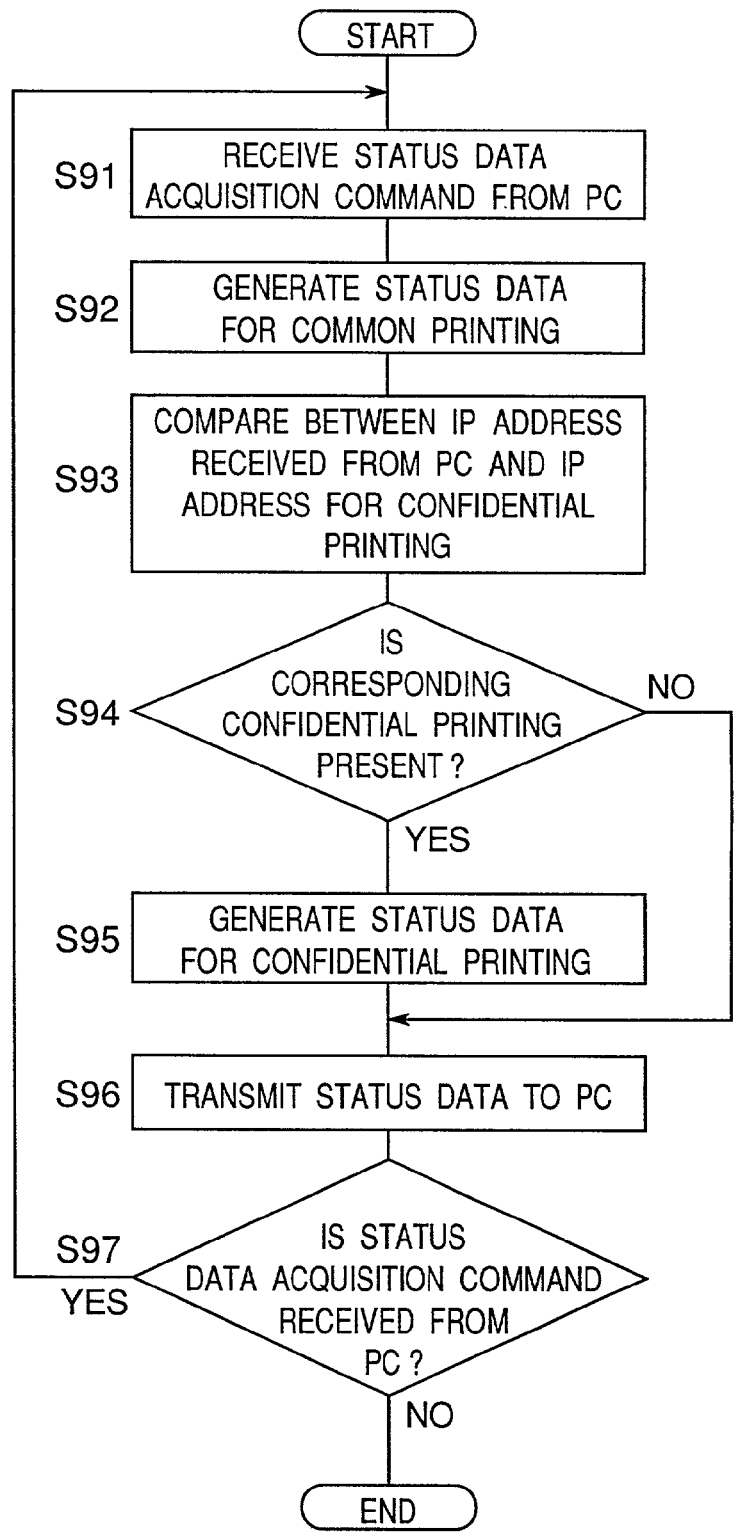
FIG. 22 is a flowchart showing a procedure of printing actions of the printer controlled by the status data displaying action of the PC shown in FIG. 21.

FIG. 22 is a flowchart showing a procedure of printing actions of the printer 20 controlled by the status data displaying action of the PC shown in FIG. 21. The procedure starts with receiving a command for acquisition of the status data from the PC (S91) and generating the status data of a job data for the common printing (S92). The IP address received from the PC along with the command for acquisition of the status data is compared with the IP address of the job data determined for the confidential printing and stored in the printer 20 (S93). It is then examined from the result of the comparison whether the job data for the confidential printing is provided or not (S94). When it is judged that the job data for the confidential printing is provided, the status data of the job data for the confidential printing is produced (S95) and the procedure goes to S96. When it is judged that the job data for the confidential printing is not provided at S94, the procedure jumps to S96. At S96, the status data produced at S92 and S95 are transmitted to the PC which delivers the command for acquisition of the status data. It is further examined whether another command for acquisition of the status data is received from the PC 10, 40, or 50. When so, the procedure returns to S91 for repeating the above steps. When it is judged at S97 that a command is not received, the procedure is terminated.

FIG. 23 illustrates an example of the status data screen displayed on the PC 10 as arranged accessible to Suzuki. The screen displays the job data No.1 for the common printing and the job data No2 for the confidential printing of which the owner is Suzuki. The job data for the confidential printing determined by other users than Suzuki are not displayed.

Therefore, the status data of a job data for the confidential printing is produced only when the IP address of the job data is identical to the IP address received by the printer along with a command for acquisition of the status data. Otherwise, no status data is displayed and the secrecy of each job data for the confidential printing can be ensured. While the status data screen for the manager for the printer is not provided in the fourth embodiment, a job data for the confidential printing may be produced when the IP address of the manager for the printer registered in advance is found identical to the IP address received together with a command for acquisition of the status data. In this case, the document name of the job data for the confidential printing is not displayed.

The actions and steps illustrated in the flowcharts of the foregoing embodiments are conducted and controlled by the operating programs installed in the PCs 10, 40, and 50 and the printer 20. More specifically, the operating programs are stored in the ROMs 12 of the PCs 10, 40, and 50 and the ROM 22 of the printer 20 (See FIG. 1). The storing means for storing the programs are not limited to the ROMs but may be any other external recording mediums such as a CD-ROM 17 or a floppy disk 18 arranged readable by the PC 10.

It would be understood that the present invention is not limited to the foregoing embodiments but various modifications and changes are possible without departing the scope of the present invention.

What is claimed is:

1. A computer readable medium storing a computer program for a printer driver is, the computer program causing a computer to carry out a process comprising the steps of:
    examining whether a confidential printing is requested for a job data to be printed out or not;
    when the confidential printing is requested, deleting or altering only a document name contained in a header of the job data;
    releasing the job data from which the document name has been deleted or altered; and
    displaying on a display a status of the job data for the confidential printing without the document name of the job data for the confidential printing and displaying a status of the job data for a non confidential printing with the document name of the job data.

2. The computer readable medium according to claim 1, wherein the process further comprises a step of requesting the confidential printing for the job data through the entry action of a user.

3. The computer readable medium according to claim 1, wherein the alteration of the document name in the job data includes an encryption of the document name.

4. The computer readable medium according to claim 1, wherein the alteration of the document name in the job data includes a movement of the document name from an original data area to a data area different from the original data area.

5. A method of processing a printing job data in a data processor for transmitting the printing job data to a printer, the method comprising the steps of:
    examining whether a confidential printing is requested for a job data to be printed out or not;

when the confidential printing is requested, deleting or altering only the document name contained in a header of the job data;
released the job data from which the document name has been deleted or altered; and
displaying on a display a status of the job data for the confidential printing without the document name of the job data for the confidential printing and displaying a status of the job data for a non confidential printing with the document name of the job data.

6. The method of processing a printing job data according to claim 5, wherein the alteration of the document name in the job data includes an encryption of the document name.

7. The method of processing a printing job data according to claim 5, wherein the alteration of the document name in the job data includes a movement of the document name from an original data area to a data area different from the original data area.

8. An apparatus for data processing having a display and arranged for transmitting a processed printing job data to a printer, comprising:
   a setter for setting a confidential printing for the job data;
   a transmitter controller for transmitting the job data to the printer;
   a receiver controller for receiving from the printer a status data indicative of a processing state of the job; and
   a display controller for displaying the received status data on a display, wherein
   the display controller displays a status condition of the job data for the confidential printing without the document name of the job data for the confidential printing and displays a status condition of the job data for a non confidential printing with the document name of the job data.

9. The apparatus for data processing according to claim 8, further comprising a data processing controller for deleting or altering the document name contained in the job data when the confidential printing is requested, wherein
   the transmitter controller transmits to the printer the job data in which the document name is deleted or altered.

10. A printing system having at least one data processor equipped with a display and a printer for carrying out a printing action according to a job data received from the data processor, the data processor comprising:
   a setter for setting a confidential printing for the job data;
   a first transmitter controller for transmitting the job data to the printer;
   a receiver controller for receiving from the printer a status data indicative of a processing state of the job; and
   a display controller for displaying the received status data on a display, wherein
   the display controller displays a status condition of the job data for the confidential printing without the document name of the job data for the confidential printing and displays a status condition of the job data for a non confidential printing with the document name of the job data.

11. The printing system according to claim 10, wherein the data processor further comprises a data processing controller for deleting or altering the document name contained in the job data when the confidential printing is requested.

12. The printing system according to claim 10, wherein the data processor further comprises a second transmitter controller for transmitting a command for transmission of the status data to the printer while the printer includes a third transmitter controller for transmitting the status data to the data processor when receiving the command for transmission.

13. The printing system according to claim 12, wherein the second transmitter controller transmits the identification data of a user along with the command for transmission of the status data and the third transmitter controller transmits the status data based on the identification data of the user.

14. The printing system according to claim 12, wherein the first transmitter controller transmits to the printer the job data added with an IP address of the data processor, the second transmitter controller transmits the IP address along with the command for transmission of the status data, and the third transmitter controller transmits the status data of a job data added with an IP address which is identical to the IP address received from the second transmitter controller.

* * * * *